No. 665,767. Patented Jan. 8, 1901.
H. W. WOOLBERT.
VESSEL.
(Application filed May 12, 1900.)

(No Model.) 2 Sheets—Sheet 1.

WITNESSES:
Edward Thorpe.

INVENTOR
Henry W. Woolbert.
BY
ATTORNEYS

No. 665,767. Patented Jan. 8, 1901.
H. W. WOOLBERT.
VESSEL.
(Application filed May 12, 1900.)
(No Model.) 2 Sheets—Sheet 2.
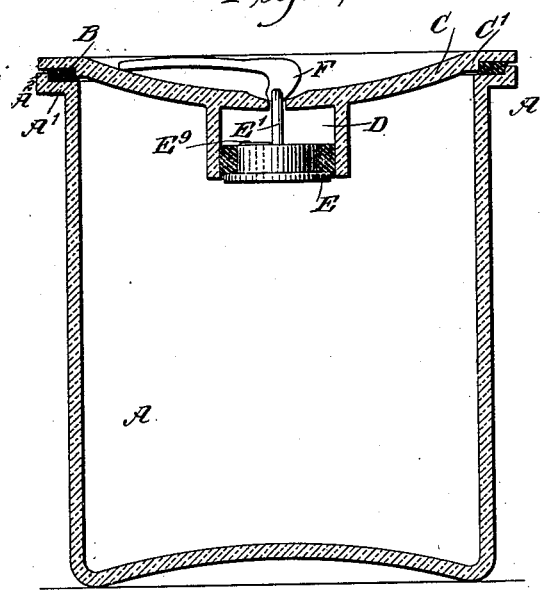
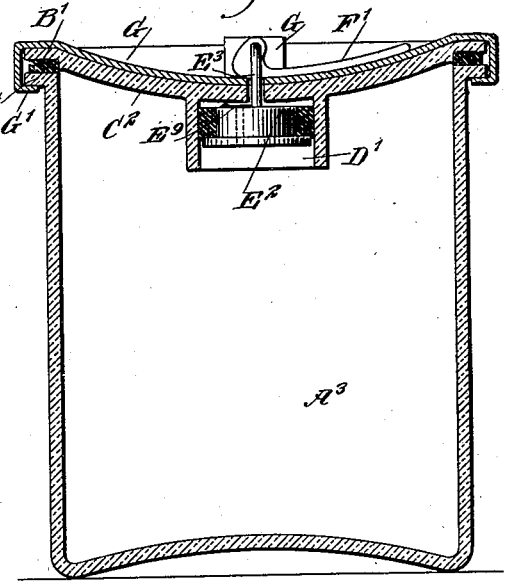
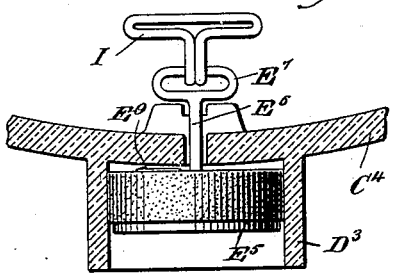
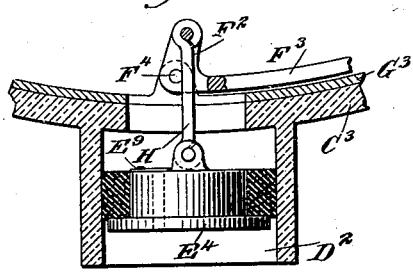
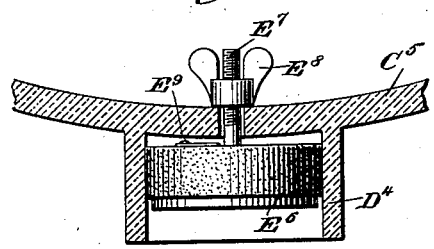
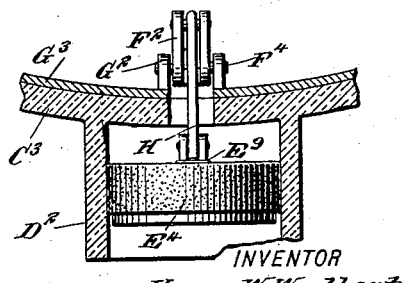
WITNESSES.
Edward Thorpe
Rev. G. Hosted
INVENTOR
Henry W. Woolbert.
BY 
ATTORNEYS

UNITED STATES PATENT OFFICE.

HENRY W. WOOLBERT, OF BELLE VERNON, PENNSYLVANIA.

VESSEL.

SPECIFICATION forming part of Letters Patent No. 665,767, dated January 8, 1901.

Application filed May 12, 1900. Serial No. 16,530. (No model.)

*To all whom it may concern:*

Be it known that I, HENRY W. WOOLBERT, a citizen of the United States, and a resident of Belle Vernon, in the county of Fayette and State of Pennsylvania, have invented a new and Improved Vessel, of which the following is a full, clear, and exact description.

The invention relates to packing and storing vessels; and its object is to provide a new and improved vessel for containing fruits and other products arranged to prevent confining compressed air in the vessel when closing down the lid or cover.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in all the views.

Figure 1:
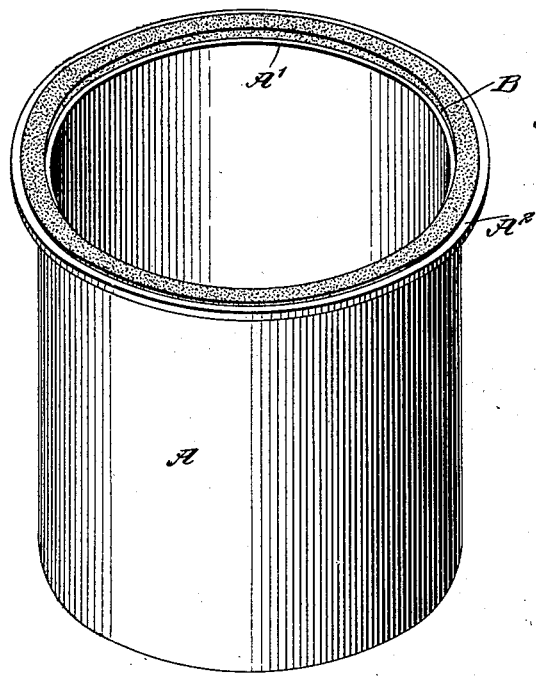
Figure 3:
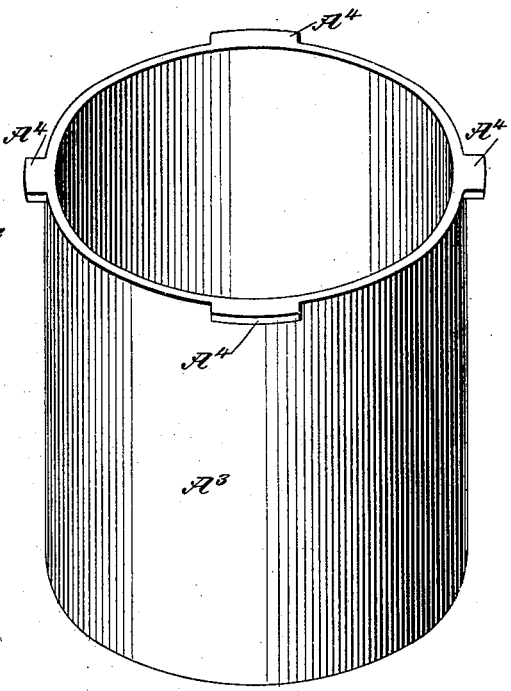
Figure 2:
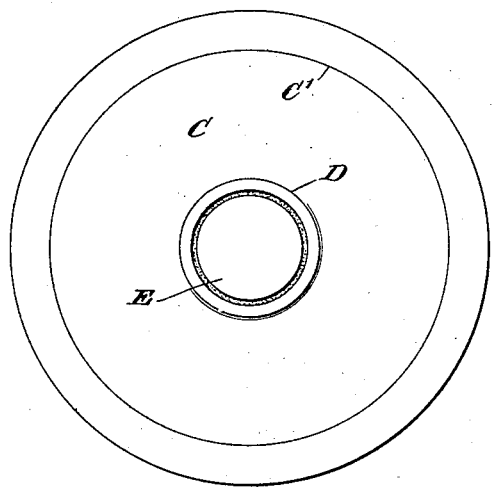
Figure 4:
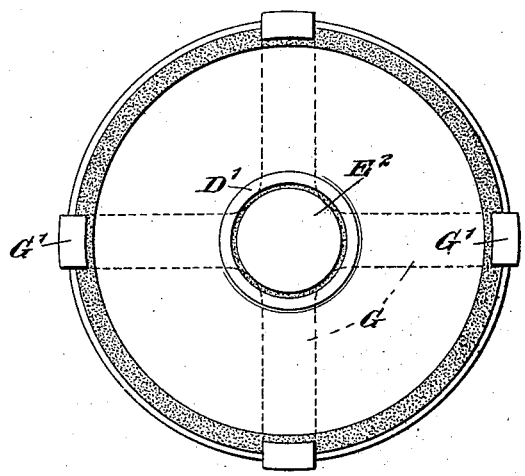

Figure 1 is a perspective view of the vessel-body. Fig. 2 is an inverted plan view of the cover. Fig. 3 is a perspective view of a modified form of the body. Fig. 4 is an inverted plan view of the cover for the same. Fig. 5 is a sectional side elevation of the improvement having the body and cover shown in Figs. 1 and 2. Fig. 6 is a similar view of the modified form of the improvement having the body and cover shown in Figs. 3 and 4. Fig. 7 is an enlarged sectional side elevation of a modified form of the improvement.
Fig. 8 is a transverse section of the same. Fig. 9 is a sectional side elevation of a further modified form of the improvement, and Fig. 10 is a similar view of another modified form of the improvement.

The improved vessel illustrated in Figs. 1, 2, and 5 consists of a body A, formed at its upper end with an outwardly-extending flange $A'$, terminating in a vertically-rising rim $A^2$ to form an abutment for a rubber ring or gasket B, resting on the flange $A'$ and engaged by a rib $C'$ on the under side of the cover C, used for closing the body A after the latter is filled with the material to be stored. On the under side of the somewhat-dished cover C is formed a cylindrical cup D, in which fits a valved plunger E, having its stem $E'$ extending upwardly through an opening in the cover C to connect with a cam-lever F, arranged on the top of the dished cover C and under the control of the operator to permit of swinging the lever over, so as to draw the plunger E up in the cup D after the body is filled and the cover is placed in position on said body. The valve $E^9$ on the plunger E opens outwardly to allow escape of air, but prevents entrance of air to the cup D. Now it is evident that when the body A is filled with fruit or other product and the cover C is placed in position on the ring or gasket B and the plunger E is in an uppermost position and the operator swings the cam-lever F over to the position shown in Fig. 5 then the plunger E is moved downward in the cup to force a portion of the air out of the body A, and when the lever is swung back to its first position the plunger is drawn up in the cup, and as the air now spreads into the cup the air-pressure is further reduced and a partial vacuum is formed in the body.

In the modified form shown in Figs. 3, 4, and 6 the body $A^3$ is formed at its upper end with outwardly-extending lugs $A^4$ to support a gasket $B'$ and be engaged at their under side by lugs $G'$ on arms G, held on the top of the cover $C^2$ used for closing the body $A^3$. On the under side of the cover $C^2$ is formed a cup $D'$, in which is mounted to slide a valved plunger $E^2$, connected at its stem $E^3$ with a cam-lever $F'$, arranged on the outside of the cover and under the control of the operator for the purpose above described in reference to Figs. 1, 2, and 5.

In the modified form shown in Figs. 7 and 8 the under side of the cover $C^3$ is provided with a cup $D^2$, in which is mounted a plunger $E^4$, connected by a link H with the upwardly-extending arms $F^2$ of a bell-crank lever $F^3$, fulcrumed at $F^4$ on lugs $G^2$, extending upwardly from the arms $G^3$ used for securing the cover in place on the body $A^3$, as above described in reference to Fig. 6. The operation of this device is the same as above described in reference to Figs. 5 and 6—that is, after the cover is placed on the body $A^3$ with the plunger $E^4$ first in an uppermost position then the operator manipulates the bell-crank lever $F^3$ so as to reduce the air-pressure in the cup $B^2$ for the purpose above explained.

In the modified form shown in Fig. 9 the under side of the cover $C^4$ is formed with a cup $D^3$, in which is mounted to slide a plunger $E^5$, having its stem $E^6$ formed with a loop $E^7$, adapted to be engaged by a handle I under the control of the operator for moving the plunger $E^5$ downward and upward in the cup $D^3$ after the cover $C^4$ is placed in position on the body $A^3$.

In the modified form shown in Fig. 10 the under side of the cover $C^5$ is formed with a cup $D^4$, in which is mounted to slide a plunger $E^6$, having an upwardly-extending threaded stem $E^7$, on which screws a wing-nut $E^8$, abutting against the top of the cover $C^5$, so as to allow of moving the plunger $E^6$ downward and upward in the cup $D^4$ for the purpose explained in reference to the other figures of the drawings.

Having thus fully described my invention, I claim as new and desire to secure by Letters Patent—

A vessel comprising a body, a cover having a cup or cylinder permanently open at its lower end to always communicate with the interior of the body, and also open at its upper end to permanently communicate with the surrounding air, a perforated plunger movable in said cylinder, and an upwardly or outwardly opening valve controlling the perforation of the plunger.

In testimony whereof I have signed my name to this specification in the presence of two subscribing witnesses.

HENRY W. WOOLBERT.

Witnesses:
HARRY W. LEACH,
WINFIELD S. SHUNK.